(No Model.)
C. GOODYEAR, Jr.
OPTICAL LANTERN.
No. 565,346.
Patented Aug. 4, 1896.
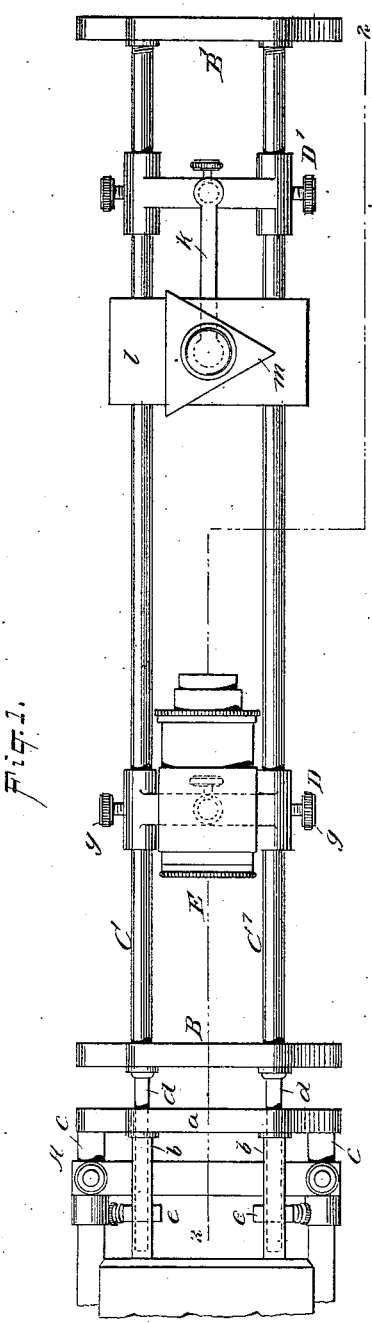
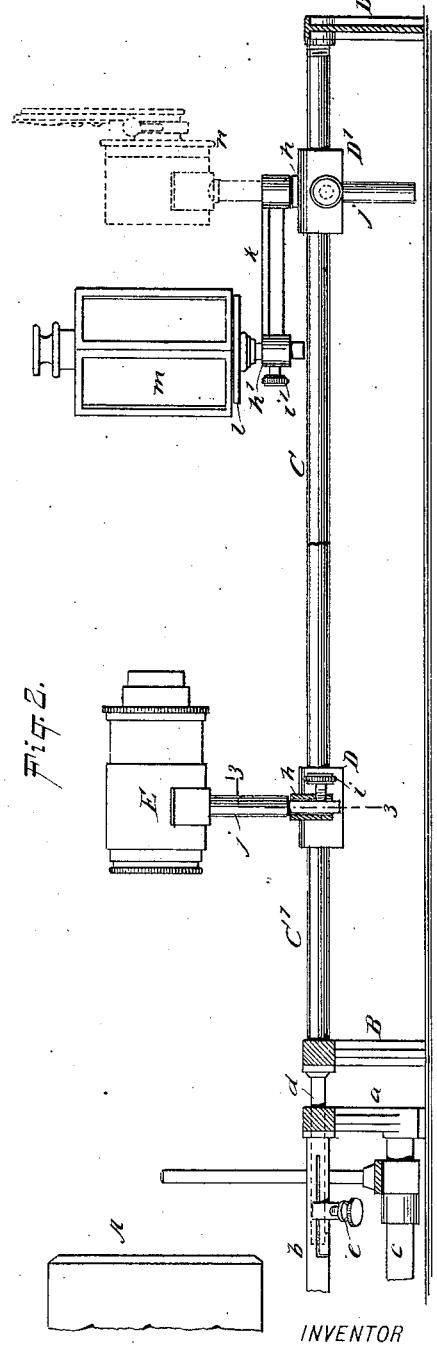
WITNESSES:
William Goebel.
G. M. Hopkins.
INVENTOR
C. Goodyear Jr
BY
Munn & Co
ATTORNEYS.

(No Model.)
C. GOODYEAR, Jr.
OPTICAL LANTERN.
No. 565,346.
3 Sheets—Sheet 2.
Patented Aug. 4, 1896.
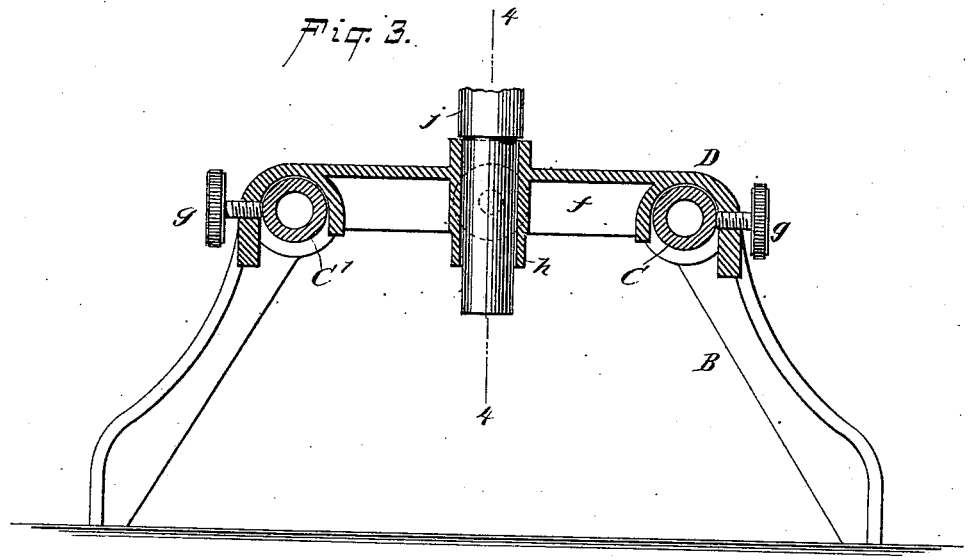
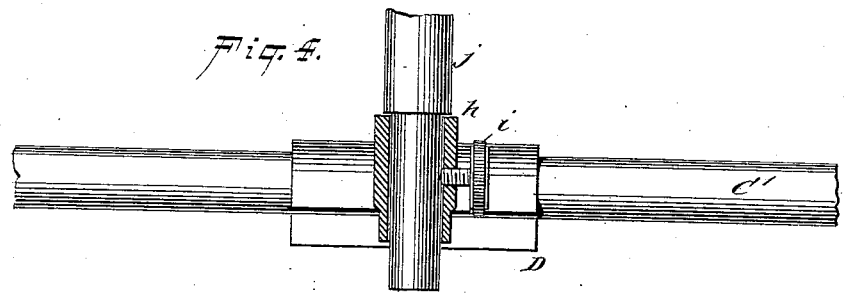
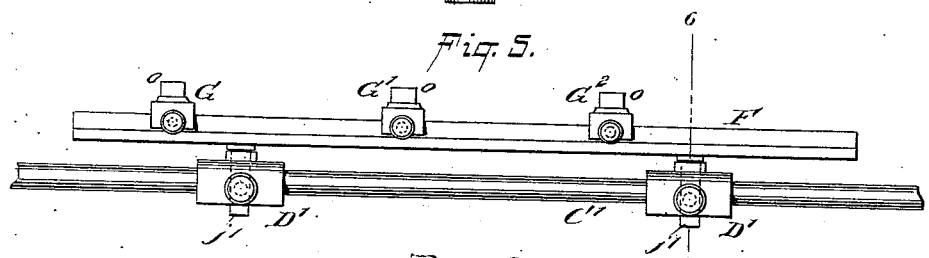
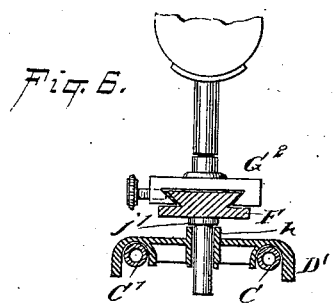
WITNESSES:
William Goebel
G. M. Hopkins
INVENTOR
C. Goodyear Jr
BY
Munn & Co
ATTORNEYS.

(No Model.)
C. GOODYEAR, Jr.
OPTICAL LANTERN.
No. 565,346.
3 Sheets—Sheet 3.
Patented Aug. 4, 1896.
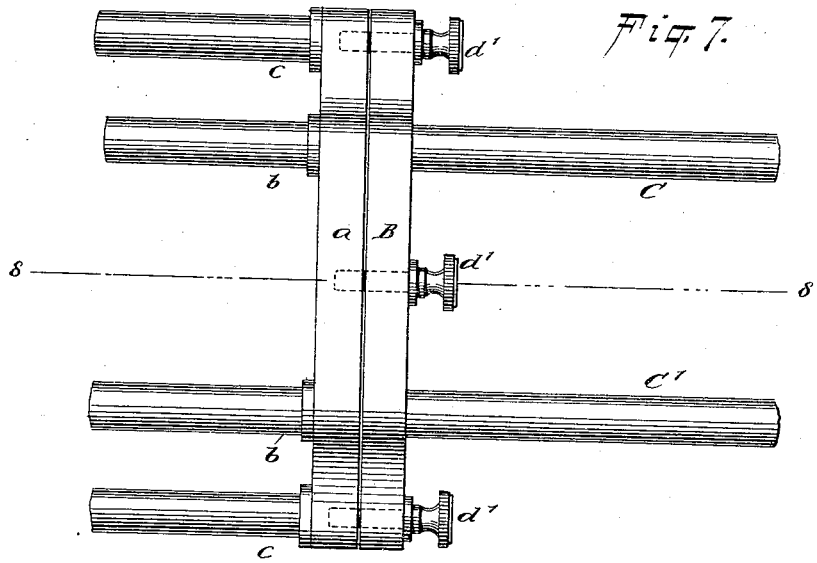
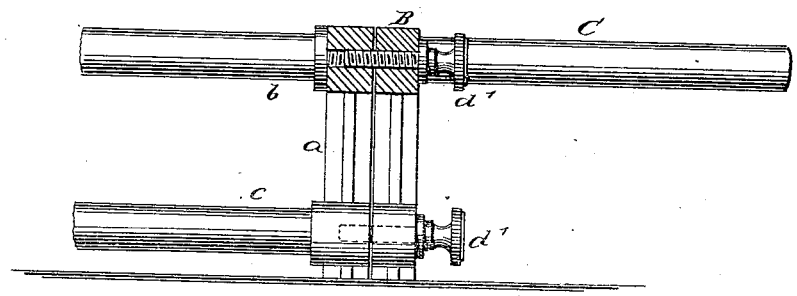
WITNESSES:
William Goebel
G. M. Hopkins
INVENTOR
C. Goodyear Jr.
BY
Munn & Co.
ATTORNEYS.

UNITED STATES PATENT OFFICE.

CHARLES GOODYEAR, JR., OF NEW YORK, N. Y.

OPTICAL LANTERN.

SPECIFICATION forming part of Letters Patent No. 565,346, dated August 4, 1896.

Application filed March 19, 1895. Serial No. 542,413. (No model.)

*To all whom it may concern:*

Be it known that I, CHARLES GOODYEAR, Jr., of New York city, in the county and State of New York, have invented a new and Improved Optical Lantern, of which the following is a full, clear, and exact description.

The object of the invention is to construct an optical lantern for scientific projection in which the several attachments are made readily interchangeable, so that the lantern may be used for projections of widely-different character without the necessity of consuming time in making changes and adjustments.

My invention consists in an optical lantern provided with tubes or sockets for receiving the ends of rods or tubes projecting from and forming part of an optical bench, and in the combination therewith of an optical bench formed of two rods or tubes with supporting-legs, the said rods or tubes being provided with extensions to fit the tubes or sockets of the lantern.

It also consists in adapters fitted to the optical bench for holding the shanks of the different attachments.

It also further consists in an auxiliary bench fitted to the adapters of the main optical bench for receiving microscope attachments, all as will be hereinafter more fully described.

Reference is to be had to the accompanying drawings, forming a part of this specification, in which similar letters of reference indicate corresponding parts in all the views.

Figure 1 is a plan view of the optical bench, showing a portion of the lantern to which it is attached. Fig. 2 is a vertical longitudinal section taken on line 2 2 in Fig. 1. Fig. 3 is an enlarged transverse section taken on line 3 3 in Fig. 2. Fig. 4 is an enlarged vertical longitudinal section taken on line 4 4 in Fig. 3. Fig. 5 is a side elevation of a portion of the main bench, showing the auxiliary microscope-bench. Fig. 6 is a transverse section taken on line 6 6 in Fig. 5. Fig. 7 is a plan view of a bench, showing a modified form of attachment; and Fig. 8 is a vertical longitudinal section taken on line 8 8 in Fig. 7.

The front legs $a$ of the lantern A are connected with the rear legs (not shown) by tubes $b\ c$. The frame thus constructed supports the condensers and one of the hoods of the lantern, all of which are of well-known construction and form no part of my present invention except in so far as they enter into combination with my improved optical bench and parts connected therewith.

In threaded holes in the legs B B' are inserted tubes C C', which are parallel with each other and lie in the same plane. In the ends of the tubes C C', which pass through the legs B, are inserted smaller tubes $d$, which project beyond the legs B and are fitted to the tubes $b$ of the lantern-frame. The said tubes $b$ are slit longitudinally, forming tongues which are pressed against the tubes $d$ by screw-clamps $e$, placed on the tubes $b$. The legs B B' and tubes C, C', and $d$ form an optical bench to be applied to the lantern in the manner described for holding the adapters D D', which receive the different appliances used in connection with the lantern.

The adapters D D', which are alike, are preferably made of aluminium in order to reduce the weight of the lantern. Any number of such adapters may be provided for holding the different attachments. The adapter D consists of a transverse bar $f$, having opposite ends widened and grooved to fit the tubes C C', and in the ends of the adapter D are inserted clamping-screws $g$, which bear upon the tubes C C' and hold the adapter in the position of use. In the center of the bar $f$ is formed a sleeve $h$, in the side of which is inserted a clamping-screw $i$. The several attachments to be used in connection with the lantern are provided with shanks $j$, fitted to the sleeves $h$ of the adapter, so that any shank of any attachment can be inserted in any adapter.

In Figs. 1 and 2 I have shown a projecting lens E, having its shank $j$ inserted in the sleeve $h$ of the adapter D and held therein by the clamping-screw $i$. In the sleeve $h$ of the adapter D' is inserted the shank $j$ of the arm $k$, the free end of which is supplied with a sleeve $h'$ and a clamping-screw $i'$, the said sleeve $h'$ being designed for receiving the shank of any attachment. In the present case the attachment supported by the arm $k$ is a table $l$, on which rests a prism $m$. In connection with the adapter D' is shown a microscope-stage $n$ in dotted lines. (See Fig. 2.)

It will thus be seen that an attachment of any kind to be used with the lantern is provided with a shank $j$, which fits into the sleeve $h$ of any of the adapters.

It will also be seen that the adapters may be removed from the rods C C' after loosening the screws $g$; also that the adapters may be moved to any position along the length of the rods C C'.

In addition to the attachments applied directly to the lantern by means of the adapters I have provided an auxiliary bench F, furnished with shanks $j'$, which are received in the adapters. The auxiliary bench is preferably made dovetail in cross-section, and the holders G G' G² are furnished with dovetail grooves fitted to the bench and the sleeves $o$ for receiving the shanks of the microscopic attachments. The holders G G' G², being narrower and smaller, permit of the close adjustment of the parts of the lantern-microscope. These parts are all provided with shanks of a standard size, which fit the sleeves $o$ of the holders G G' G².

In the modification shown in Figs. 7 and 8 the rods $d$ are omitted from the bench and the leg B is attached to the lantern by screws $d'$, passing through the leg B into the leg $a$ of the lantern, thereby clamping the bench securely to the lantern-frame.

The main bench is constructed of tubes to insure lightness, but solid rods will answer the same purpose. Therefore I do not confine myself to this construction.

Having thus described my invention, I claim as new and desire to secure by Letters Patent—

1. In an optical lantern, the combination with the lantern-frame partly formed of tubes, of an optical bench formed of parallel rods and legs, and means for detachably clamping the bench to the lantern-frame, substantially as specified.

2. In an optical lantern, the combination, with a lantern-frame provided with tubular longitudinal members, of an optical bench formed of parallel rods provided with legs and cylindrical extensions fitted to the tubular members of the lantern-frame and a detachable clamping device for holding the bench in the position of use, substantially as specified.

3. In an optical lantern, the combination with a lantern-frame having tubular longitudinal members, of an optical bench having rods constructed to engage with the tubular members of the lantern-frame, and an adapter provided with longitudinal grooves fitted to the rods of the optical bench, and furnished with a sleeve the adapter being constructed to clamp the rods of the optical bench, substantially as specified.

4. In an optical lantern, having a frame provided with tubular longitudinal members, the combination, with an optical bench formed of rods constructed to engage with the tubular members of the lantern-frame, of an adapter adjustably fitted to the rods and provided with a sleeve for receiving the shanks of different attachments, and a lantern attachment provided with a shank constructed to enter into the sleeve of the adapter, substantially as specified.

5. In an optical lantern, the combination of the lantern-frame having tubular members, the removable optical bench formed of rods and constructed to engage with the tubular members of the lantern-frame and provided with legs for supporting the same, adapters adjustably clamped to the optical bench and provided with sleeves, and an auxiliary bench furnished with shanks fitted to the adapters, substantially as specified.

CHARLES GOODYEAR, Jr.

Witnesses:
WALTER GOODYEAR,
JAMES B. COLT.